Aug. 26, 1969     E. HERION, JR     3,463,192
SLIDE VALVE
Filed Nov. 29, 1967     2 Sheets-Sheet 1
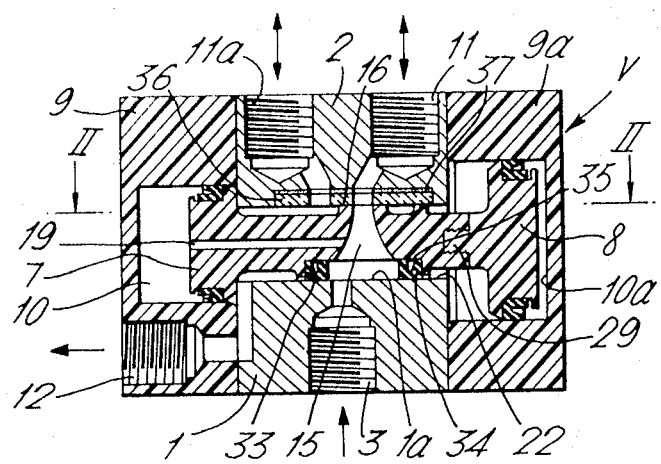
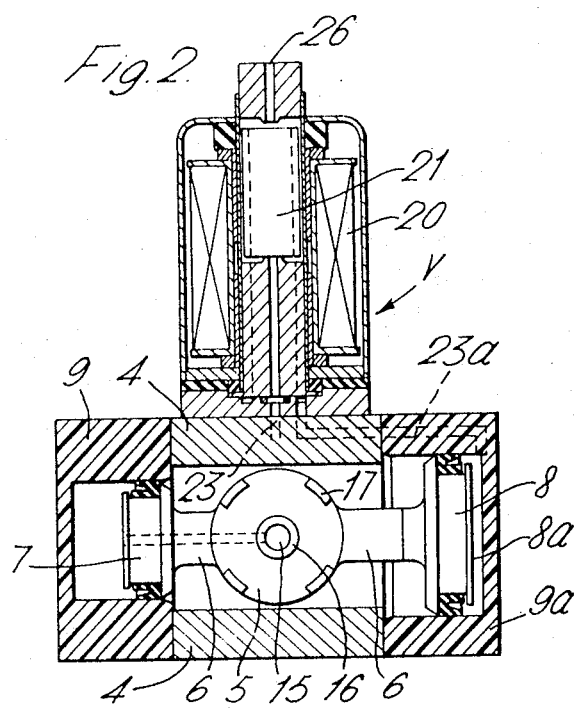
INVENTOR
ERICH HERION, JR.
BY
ATTORNEYS Aug. 26, 1969  E. HERION, JR  3,463,192
SLIDE VALVE
Filed Nov. 29, 1967  2 Sheets-Sheet 2
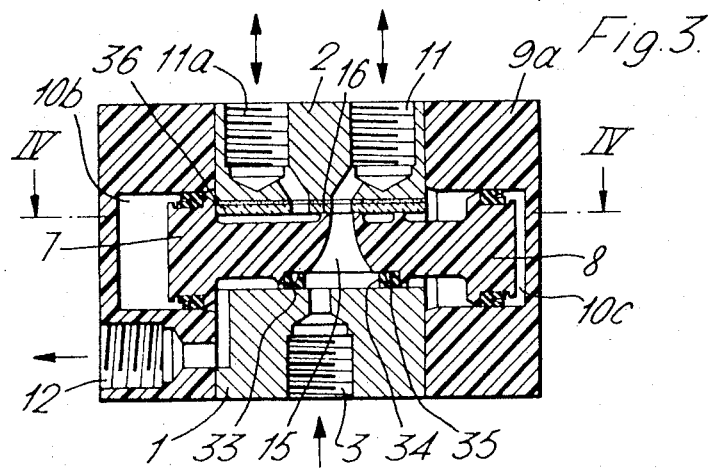
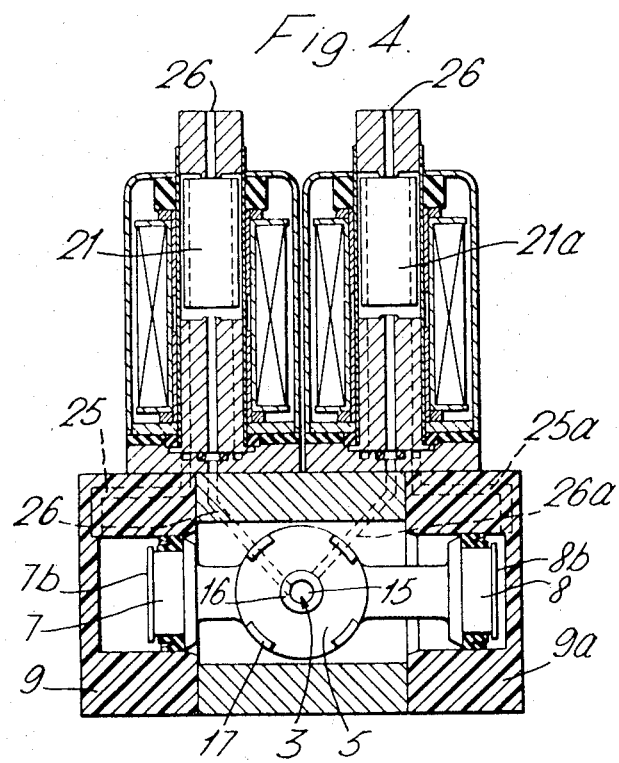
INVENTOR
*ERICH HERION, JR.*
BY *noelle & noelle*
ATTORNEYS ём
United States Patent Office 3,463,192
Patented Aug. 26, 1969

3,463,192
SLIDE VALVE
Erich Herion, Jr., Stuttgart-Frauenkopf, Germany, assignor to Erich Herion, Sr., Stuttgart-Frauenkopf, Germany
Filed Nov. 29, 1967, Ser. No. 686,572
Int. Cl. E03b; E03c; F17d
U.S. Cl. 137—625.64        12 Claims

ABSTRACT OF THE DISCLOSURE

A slide valve comprising a housing, a slide movably arranged in the housing and having a central portion of substantially rectangular cross section and two reversing piston portions respectively at opposite ends of the central portion, the slide being made of a relatively rigid plastic material on a high-molecular weight polyoxymethylene base, and a hard-sintered ceramic disc on an aluminum oxide base, inserted in the housing adjacent the central portion for slidably supporting the slide.

BACKGROUND OF THE INVENTION

The present invention relates to a change-over or reversing flat slide valve with a servo-piston drive controlled by an auxiliary or pilot valve. The magnetically operable pilot valve or valves alternately connect auxiliary conduits branced off from the supply line of the servo-medium with chambers located behind the two piston end faces, respectively.

With such slide valves, the sealing of the rectangular slide by means of several separate elastic sealing rings is required, which sealing rings are located in recesses of the slide housing or of the slide while the slide is either completely or at least partially relieved from pressure acting thereon. With slide valve constructions in which the slide is continuously reciprocated with respect to the housing, such seals are subjected to considerable wear.

It is, therefore, an object of the present invention to provide a changeover or reversing flat slide valve, in which the life of the seals in the valve is considerably extended over heretofore known slide valves of this type.

It is still another object of the present invention to provide a flat slide valve of the type referred to above, in which the sealing of the slide is considerably simplified and in which the life of the slide especially under dry running conditions is increased, while the structure of that portion of the slide which carries the closing member of the valve is simplified and improved.

Another object of the present invention consists in the provision of a valve as set forth above, in which the sealing of the gap between the slide and the valve housing is considerably simplified, when there exists a sealing abutment on one side of the slide only.

These and other objects and advantages of the invention will appear more clearly from the following specification, in connection with the accompanying drawing, in which:

FIG. 1 is a cross section through a four-way slide valve according to the present invention;

FIG. 2 is a section taken along the line II—II of FIG. 1;

FIG. 3 is a cross-section similar to that of FIG. 1 of a slightly modified slide valve; and FIG. 4 is a section taken along the line of III—III of FIG. 3.

BRIEF SUMMARY OF THE INVENTION

In conformity with the present invention, the slide comprises a valve closing member made of a substantially rigid synthetic material on a high-molecular weight polyoxymethylene base, i.e. an unbranched polymer of formaldehyde of high crystallinity, while the running surface of the housing for engagement with the slide consists of separate, ceramic discs inserted into the housing and produced in a hard sinter process on an aluminum-oxide base ($Al_2O_3$). The sliding surfaces are polished and lapped, and contain silicic acid or chromium oxide, in order to increase the hardness of the surface. The running surface of the housing is arranged on the outlet side of the servo-medium, and the slide is pressed against this surface by the pressure prevailing in the fluid supply or inlet so that only one single elastic seal is required.

DETAILED DESCRIPTION OF A PREFERRED EMBODIMENT

Referring now to the drawing in detail, and FIGS. 1 and 2 in particular, the valve V shown therein comprises a substantially U-shaped lower housing portion 1 with a servo-medium inlet 3, and an upper housing portion 2 closing housing portion 1 so that a housing with a rectangular cross section is formed which confines a rectangular cavity or recess 1a. The leg portions 4 of the U-shaped lower housing portion 1 are visible in FIG. 2, one of said legs carrying one or a plurality of auxiliary or pilot valves 21 (one being shown in FIG. 2).

The rectangular cavity 1a formed by housing portions 1 and 2 is occupied by a flat slide 5 having a substantially circular outer circumferential surface. Slide 5 is, in longitudinal direction thereof, provided with extensions 6 the ends of which carry reversing pistons 7, 8 respectively. Pistons 7 and 8 are respectively arranged in lid portions 9, 9a in bores 10, 10a thereof. Piston 8 is detachably connected to slide 5 at 29, for instance by press fitting or threading piston 8 into slide 5. The arrangement is such that upon detachment of lids 9, 9a and attachment of piston 8 from slide 5 at 29, slide 5 can be removed from the valve without detaching the various conduits connected to the valve. The upper housing portion 2 is provided with two passages 11, 11a for connection with consumers, whereas one of the lids, namely lid 9, is provided with a passage 12 for receiving a conduit serving as the return or discharge conduit of the valve. Incidentally, if only one reversing piston 7 or 8 is provided in the reversing valve, a spring may be provided as a substitute for the second reversing piston, which spring will return the slide to its starting position, in a very well-known manner.

The bottom portion of slide 5 carries a lip ring 34 in a recess 33, lip ring 34 being fluid-tightly pressed against the wall 22 of recess 33 by the pressure prevailing in inlet 3. Simultaneously, the bottom side of the lip ring is axially displaced against the lower surface of the U-shaped housing portion 1 so that a possible gap between housing 1 and slide 5 is bridged and the slide is pressed against the opposing surface of the upper housing portion 2. A central bore 15 in slide 5 will connect one or the other of the consumer connections 11, 11a with inlet 3, without any substantial losses. The flat bottom side of lip ring 34 now serves as running surface, thus performing a double function and increasing the utility of lip ring 34.

The back side of slide 5 (when looking in the direction of the flow of fluid through the valve) adjacent connections 11, 11a ends in a protruding supporting shoulder 16 with an annular or oval surface, the inner diameter of this shoulder being smaller than the diameter of lip ring 34 so that slide 5 rest against the upper surface of housing portion 2 by means of shoulder 16. In order to guide slide 5 positively with respect to the housing surface, slide 5 is provided with further supporting surfaces 17 raised above the top surface of slide 5 to the same extent as shoulder 16 and preferably arranged along the outer circumference of slide 5 (see FIG. 2). Thus, the servo-medium may flow into return conduit 12 between shoulder 16 and supporting surfaces 17 as well as past pistons 7, 8 guided in recesses 10, 10a.

In view of the present construction, with certainty slide 5 is on one hand sealingly guided with respect to the housing surfaces by means of the pressure prevailing in the inlet, and more specifically at the upper housing surface in housing portion 2, and on the other hand only the pressure prevailing in the fluid outlet or return conduit prevails between the piston on one hand and the fluid inlet on the other hand since the return conduit is always in communication therewith. Consequently, any servo-fluid that might leak through at some points, will flow back into return conduit 12 without any difficulty.

The design of the slide with the above described partial relief, yields the advantage of always furnishing the required force for reversing the valve at all prevailing operating pressures. This means that with a relatively small operating pressure also a relatively small force presses the slide against the upper housing surface so that also the relatively small reversing forces acting upon one of the servo-pistons surfaces will suffice to carry out the reversal of the valve. On the other hand, if a relatively high operating pressure prevails, the force with which the slide is pressed against the upper housing portion is larger while also a higher reversing force for reversing the piston is available.

In view of the above, the reversal of the valve is always assured, while the necessary force for sealing engagement between slide 5 and the upper housing portion in the end positions of the slide is also assured. It is merely necessary to take care that the surface of the respective diameter of the lip ring which is subjected to the pressure on the inlet side of the slide is smaller than the smallest piston end face for reversing the slide.

In the example shown in FIG. 1, servo-piston 8 is connected to slide 5 by means of a detachable connection 29. This connection may be formed by a press fit or by a thread, if desired, the connection making it possible that upon detachment of lids 9 and 9a slide 5 may be pulled laterally out of valve V. Furthermore, slide 5 is equipped with a bore 19 extending in axial direction thereof said bore communicating with the central slide bore 15 so that the end face of piston 7 is always subjected to the pressure prevailing in the fluid inlet 3. This end face is smaller than the end face of piston 8. If recess 10a adjacent end face 8a is not connected to inlet 3, piston 5 occupies the position shown in FIG. 1.

Referring to FIG. 2, as soon as the pre-control valve 21 is actuated by energizing a reversing magnet 20 so that the armature thereof is lifted, a conduit 23 connected to the servo-fluid inlet 3 communicates with an auxiliary conduit 23a leading to the end face 8a of piston 8.

The pressure builds up in front of piston 8, and slide 5 is moved towards the left against the pressure acting on piston 7.

In the arrangement according to FIGS. 3 and 4, pistons 7 and 8 have the same diameter, and the end faces 7b, 8b of these pistons are alternately subjected to the pressure prevailing in inlet 3 for the servo-fluid, by means of electromagnetically controlled auxiliary valves 21 and 21a so that slide 5 is moved first into one end position and then from there into the other end position. In this instance, as shown in FIG. 4, servo-fluid conduits 25, 25a are respectively provided in lids 9, 9a which lead from chambers 10b, 10c respectively to the outside of lids 9, 9a respectively. Further, servo-fluid conduits 26, 26a lead from inlet 3 to a lateral surface of U-shaped housing portion 1 adjacent lids 9, 9a. Adjacent openings of conduits 25, 26 in the outer housing surface of lid 9 and housing portion 1 are covered by valve 21. Similarly, openings of conduits 25a, 26a are covered by auxiliary or pilot valve 21a.

In this way, a very simple and clear course of the various conduits is achieved, and a very simple structure of valve is made possible since the auxiliary valves 21, 21a can be easily attached to and detached from the outer surface of the valve housing.

Lids 9, 9a and slide 5 with its reversing pistons 7, 8 are made of pressed or injection molded plastic material, for instance on a formaldehyde base with unbranched chains and high crystallinity, and more specifically of a high-molecular weight polyoxymethylene. For purposes of exactly guiding the flat slide 5 with respect to housing portion 2, if the servo-fluid inlet 3 is arranged within housing portion 1, a separate running surface is inserted in housing portion 2, which running surface is in the form of a ceramic disc 36 on an aluminium-oxide base and inserted in a recess 37. Disc 36 is produced in a hard-sinter process and contains silicic acid or chromium oxide at a rate of up to 6% in order to obtain a greater hardness. Disc 36 has provided therein passages for connection with consumer conduits 11 and 11a and is polished and lapped. As shown in FIG. 3, disc 36 may extend over the entire length of housing portion 2. In view of the combination of a slide of synthetic material and only one running surface of ceramic material, exact and reliable sealing surfaces are obtained while the wear is very minor, even if there exists no lubrication of the elements sliding with respect to each other.

The fact that the slide is made of the plastic material specified above and that the running surface of housing is a ceramic, makes it possible to manufacture the slide of several pieces. More specifically, the stationary running surfaces of the housing made of ceramic material are designed as discs inserted in corresponding recesses of the housing while these discs are provided with through-passages for the servo-fluid, whereas the axially displaceable slide is provided with one main passage only so that without substantial deviating losses also a multi-way slide is produced, since the inlet opening of the main passage in the slide can be enlarged or widened in a direction opposite to the flow of fluid through the slide.

In order to obtain a reliable engagement of the running surface of the slide with the running surface of the housing under the inlet pressure, and a proper bridging and closing of the gap resulting from the engagement, at the inlet side between the slide and the housing and also to assure a simultaneous seal at the slide surface facing the inlet, by means of one single elastic seal only, this elastic seal takes the shape of a lip seal arranged in a widened portion of the inlet opening of the slide, with the margin or rim of the lip so located that the inlet pressure sealingly presses the lip against the wall of the widened portion so that, in conformity with the present invention, the bottom side of the ring is moved towards the housing wall adjacent the inlet and serves as running surface. In this way, aside from a reliable seal between the slide and the housing running surface, always changes in the distance between the slide and the housing are compensated for. Depending on the selected diameter of the lip ring subjected to the inlet pressure, the force with which the slide running surface is pressed against the ceramic running surface in the housing varies accordingly.

The invention also contemplates the provision of a single sealing means between the housing and the slide different from the one shown in the drawing (lip seal 34). More specifically, that side of the slide which faces the fluid inlet, may be provided with an annular channel for receiving an O-ring seal, the back side of which is continuously exposed to the fluid in the inlet for instance by means of slots, in order to assure the proper seal and at least a partial relief of the slide. The diameter of the O-ring is larger than the diameter of a protruding supporting shoulder surrounding the outlet for the fluid at the opposite side of the slide similar to surface 16. In view of the seal between the reversing pistons and the space occupied by the slide, and in view of the engagement of the slide and the housing, by means of a protruding shoulder on the backside of the slide, the space therebetween is utilized for the return of the servo-fluid, while the total cross section will become larger than the inlet in order to assure a fast reduction in pressure in the fluid leaving the consumer, without causing any special sealing problems.

The entire design of the valve as shown in the drawing is very simple and clear, which also holds true for the proper sealing of the various conduits. One reason for this consists in that only the back sides of the pistons are connected to the return conduit or outlet and in that the central inlet and the central passage or passages located on the opposite side for connection with a consumer or consumers are always reliably sealed in view of the design of the slide in conformity with the present invention. Minor and occasional leaks can be tolerated since the lost fluid is returned to the return or fluid outlet without influencing the operation of the slide.

The design of the valve is considerably simplified in view of the fact that the housing is composed of a U-shaped lower housing portion and a complementing upper housing portion and that one of these housing portions is provided with the fluid inlet and fluid outlet, whereas the other is provided with the connections to and from the consumers.

If a larger or smaller pressure relief of the slide with respect to the fluid return side of the housing is intended, the diameter of the shoulder protruding with respect to the slide can be made equal or substantially equal to the central diameter of the lip or O-ring on the fluid inlet side of the slide.

What is claimed is:

1. A slide valve comprising: a housing, a slide movably arranged in said housing and having a central portion of substantially rectangular cross section and two reversing piston portions respectively at opposite ends of said central portion, said slide being made of a relatively rigid plastic material on a high-molecular weight polyoxymethylene base, and a hard-sintered ceramic disc on an aluminum-oxide base, inserted in said housing adjacent said central portion for slidably supporting said slide.

2. A slide valve according to claim 1, wherein said disc of aluminum-oxide contains chromium oxide at a rate of up to approximately 6%.

3. A slide valve according to claim 1, wherein said disc of aluminum oxide contains silicic acid at a rate of up to approximately 3%.

4. A slide valve according to claim 1, wherein said housing comprises a fluid inlet on one side of said slide and passage means for connection to consumers on the opposite side thereof, said slide having a passage therethrough leading from said inlet to said passage means, annular sealing means axially movably arranged in said slide and surrounding said passage, that one end face of said sealing means which faces said disc being subjected to the pressure prevailing in said fluid inlet to thereby press the other end face thereof sealingly against the housing, said one end face of said sealing means being larger than the cross sectional area of said passage at said disc.

5. A slide valve according to claim 4, wherein said one end face is larger than the minimum cross section of said piston portions in planes perpendicular to the longitudinal axis thereof.

6. A slide valve according to claim 4, wherein said passage includes a portion widening toward said inlet and wherein said sealing means is axially displaceably received in said widened portion and comprises one flat end face for sealing engagement with the housing and a grooved end face opposite to said flat end face and including a lip for engagement with said widened portion.

7. A slide valve according to claim 4, wherein that side of said central portion which faces said disc is provided with a raised shoulder surrounding said passage and surfaces adjacent thereto, said shoulder and said surfaces slidably engaging said disc.

8. A slide valve according to claim 4, wherein said two piston portions have end faces of a size differing from each other, a conduit in said slide interconnecting the end face of the smaller piston portion with said passage, the end face of the larger piston portion communicating with said inlet.

9. A slide valve according to claim 1, wherein said housing includes a U-shaped lower portion and a substantially flat upper portion confining with said lower portion a cavity of rectangular cross section for receiving said central portion of said slide, and lid portions closing said housing at opposite ends and confining bores for respectively receiving said piston portions.

10. A slide valve according to claim 9, wherein said inlet is provided in one of said housing portions and wherein said passage means is provided in the other housing portion.

11. A slide according to claim 1, wherein said piston portion has a circular cross section and wherein said slide comprises portions respectively interconnecting said central portion with said piston portions.

12. A slide according to claim 1, wherein said piston portions are detachably connected to said central portion.

References Cited

UNITED STATES PATENTS

| | | | |
|---|---|---|---|
| 2,725,077 | 11/1955 | Nicholl | 137—625.64 |
| 2,974,682 | 3/1961 | Trask | 251—368 XR |
| 3,064,682 | 11/1962 | Holzbock | 251—282 XR |
| 3,370,611 | 2/1968 | Flint | 251—175 XR |

FOREIGN PATENTS

| | | |
|---|---|---|
| 837,114 | 6/1960 | Great Britain. |
| 1,110,970 | 7/1961 | Germany. |

HENRY T. KLINKSIEK, Primary Examiner

U.S. Cl. X.R.

137—625.25; 251—368